United States Patent
Hughes et al.

(10) Patent No.: US 7,650,517 B2
(45) Date of Patent: Jan. 19, 2010

(54) THROTTLE MANAGEMENT FOR BLADE SYSTEM

(75) Inventors: James E. Hughes, Apex, NC (US); Henry G. McMillan, Raleigh, NC (US); Challis L. Purrington, Raleigh, NC (US); Michael L. Scollard, Raleigh, NC (US); Gary R. Shippy, Cary, NC (US); Paul M. Smith, Cary, NC (US); Maya P. Yarbrough, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 11/311,818

(22) Filed: Dec. 19, 2005

(65) Prior Publication Data

US 2007/0143635 A1  Jun. 21, 2007

(51) Int. Cl.
*G06F 1/00* (2006.01)
(52) U.S. Cl. .................................... 713/300; 713/320
(58) Field of Classification Search .................. 713/300, 713/320, 340
See application file for complete search history.

(56) References Cited

U.S. PATENT DOCUMENTS

| | | | | |
|---|---|---|---|---|
| 5,719,800 A | 2/1998 | Mittal et al. | ................. | 364/707 |
| 5,787,294 A | 7/1998 | Evoy | ...................... | 395/750.03 |
| 6,367,023 B2* | 4/2002 | Kling et al. | .................. | 713/340 |
| 6,415,388 B1 | 7/2002 | Browning et al. | ........... | 713/322 |
| 6,498,460 B1 | 12/2002 | Atkinson | ..................... | 320/135 |
| 6,564,328 B1 | 5/2003 | Grochowski et al. | ......... | 713/320 |
| 6,574,740 B1 | 6/2003 | Odaohhara et al. | ........... | 713/323 |
| 6,647,502 B1 | 11/2003 | Ohmori | ....................... | 713/322 |
| 7,043,647 B2* | 5/2006 | Hansen et al. | ............... | 713/320 |
| 7,240,225 B2* | 7/2007 | Brewer et al. | ................ | 713/300 |
| 7,340,620 B2* | 3/2008 | Dove | ........................... | 713/300 |
| 7,400,062 B2* | 7/2008 | Pincu et al. | .................... | 307/29 |
| 7,444,526 B2* | 10/2008 | Felter et al. | .................. | 713/300 |
| 2003/0056125 A1 | 3/2003 | O'Conner et al. | ............ | 713/300 |
| 2005/0086543 A1* | 4/2005 | Manuell et al. | .............. | 713/300 |
| 2006/0149978 A1* | 7/2006 | Randall et al. | .............. | 713/300 |

* cited by examiner

*Primary Examiner*—Chun Cao
(74) *Attorney, Agent, or Firm*—H. Artoush Ohanian; Cynthia G. Seal; Biggers & Ohanian, LLP.

(57) ABSTRACT

Power is allocated to blades based on an estimate of the actual power they are expected to use rather than their maximum-power draw-value. To protect against situations where the estimated actual-power draw-value is exceeded, a hardware comparator monitors the blade system load against a predetermined threshold value set by a management module (MM) based on user input. If this threshold value is exceeded, a throttle latch is triggered, based on a signal from a service processor monitoring the blade system load. The output of this latch directly engages throttling. The service processor also monitors the output of the latch and communicates information regarding the throttling to the MM for evaluation.

6 Claims, 2 Drawing Sheets

THROTTLE MANAGEMENT FOR BLADE SYSTEM

BACKGROUND OF THE INVENTION

1. Field of the Invention

This invention relates to the control of throttling in blade computer systems.

2. Background of the Related Art

Operating state-of-the-art blade systems presents a significant challenge due to the newer power-hungry processor options of the blades in the system. Power supplies used in blade systems are not keeping up with the power requirements of the blades. A typical blade system may have up to 14 blades sharing power from up to four power supplies. Typically, full redundancy is built in so that in a situation where all of the blades are operating at 100%, there is sufficient power among the power supplies such that if there is a power supply failure, the other power supplies can continue to supply power to the blades without curtailing their operation. In some cases, power draws may be allowed to exceed the level at which the system is fully redundant, and in some extreme cases, the power allocation may be such that there is no redundancy at all, i.e., if one of the power supplies were to fail, significant reductions in power to the blades would have to be made.

When determining power allocation in a prior art blade system, assumptions are made that worst-case scenarios are occurring, that is, it is assumed that each blade will be running at 100% power at all times, and then power is allocated based upon this assumption. Typically, the maximum-power draw-value is obtained from the VPD of the blade and then power allocation is set accordingly. In reality, however, it is rare when all blades are running at 100% power and, in fact, it is estimated that only one out of every 1,000 blades will require 100% power in actual operation. Thus, there is significant power available in most situations to allocate to other blades, but because the worst-case scenario is used for each blade, this "excess power" is not utilized.

It would be desirable to have a method, system, and computer program product that enables actual system loads to be utilized for allocation of power in blade systems.

SUMMARY OF THE INVENTION

In accordance with the present invention, power is allocated to blades based on an estimate of the actual power they are expected to use rather than their maximum-power draw-value. To protect against situations where the estimated actual-power draw-value is exceeded, a hardware comparator monitors the blade system load against a predetermined threshold value set by a management module (MM) based on user input. If this threshold value is exceeded, a throttle latch is triggered, based on a signal from a service processor monitoring the blade system load. The output of this latch directly engages throttling. The service processor also monitors the output of the latch and communicates information regarding the throttling to the MM for evaluation.

DETAILED DESCRIPTION OF THE PREFERRED EMBODIMENTS

Figure 1:
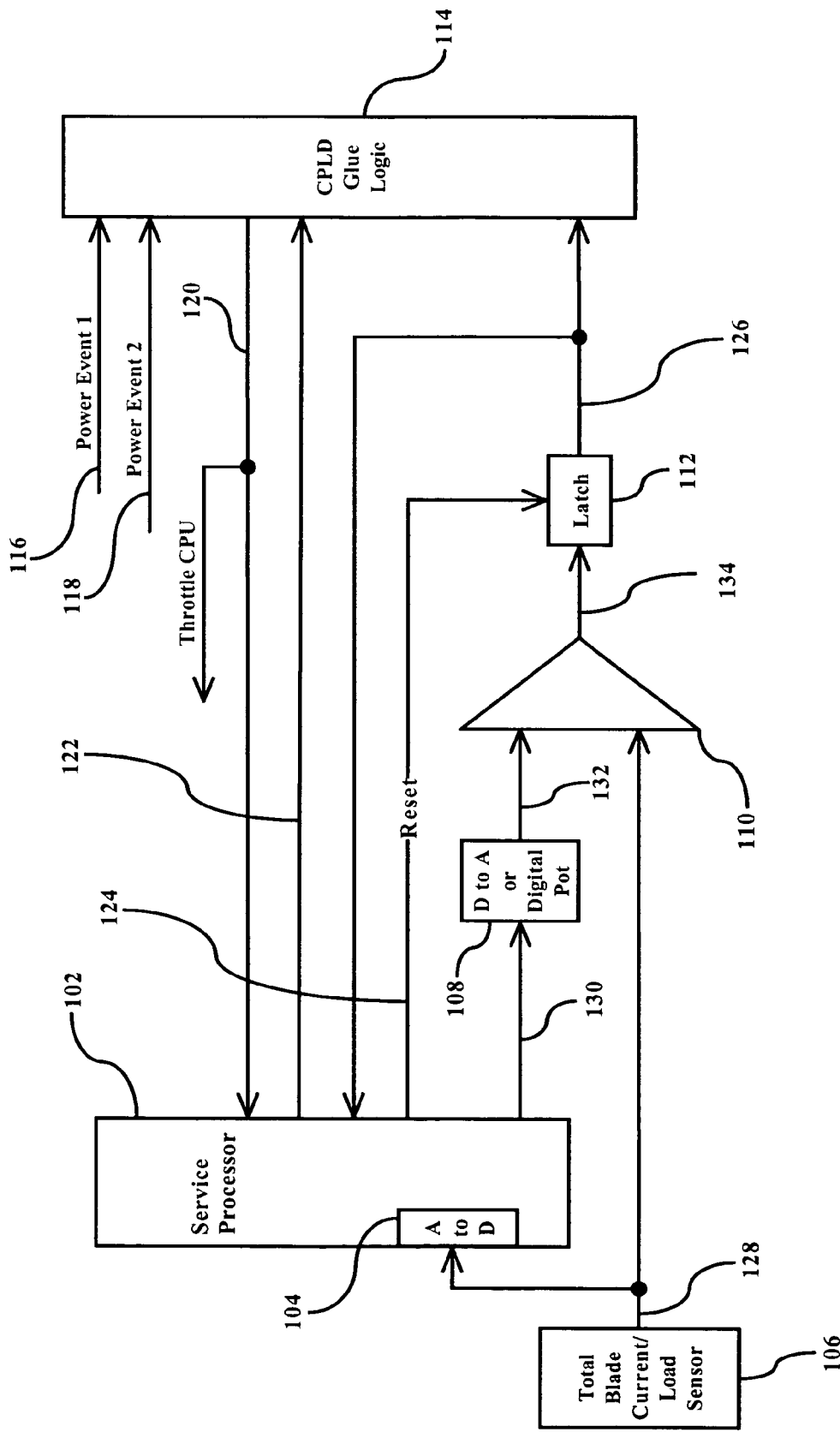
FIG. 1 is a block diagram of a system enabling the present invention.

FIG. 1 is a block diagram of a system enabling the present invention. In a preferred embodiment, each blade is equipped with the system of FIG. 1. Referring to FIG. 1, a service processor 102 having an integrated A-to-D converter 104 receives, from blade current/load sensor 106, a voltage signal 128 proportional to the total blade current being consumed by a particular blade. Signal 128 from blade current/load sensor 106 is also presented to a first input of comparator 110.

Blade current/load sensor 106 senses the current draw of the blade in which it is installed (or to which it is connected) and converts the detected current draw to signal 128, which is an analog voltage signal. Thus, the signal 128 is an analog voltage signal proportional to the current draw of the blade. A-to-D converter 104 receives this analog signal 128 and converts it to digital form for processing by the service processor 102. As shown in FIG. 1 and as noted above, service processor 102 can comprise a single chip microcontroller with an integrated A-to-D converter 104; however, it is understood that different configurations can be utilized, e.g., a multi-chip microcontroller and/or a microcontroller with a separate analog-to-digital converter.

A signal 130 output from service processor 102 is input to digital-to-analog converter 108. Signal 130 represents the digital controls used by the service processor to communicate with D-to-A converter 108. D-to-A converter 108 converts the digital output from service processor 102 into analog signal 132, which as described below, will be compared by comparator 110 with analog signal 128. If desired, a simple digital potentiometer could be used to perform the same function as D-to-A converter 108 in a known manner. Analog signal 132 is input to a second input of comparator 110. Comparator 110 is a comparator circuit that compares the magnitude of two analog signals, that is, analog signal 128 coming from total blade current/load sensor 106 and analog signal 132 being output by D-to-A converter 108. The result of this comparison is a logic 1 or a logic 0 being output as signal 134. As an example, the system could be configured so that if signal 132 is greater than signal 128, output 134 will be a logic 1; otherwise, the output of 134 would be a logic 0.

The output 134 of comparator 110 is input to latch 112. Latch 112 captures the occurrence of the current of the blade going above the present threshold by issuing an output signal 126 (e.g., a logic 1) when the predetermined threshold, represented by signal 132, has been exceeded. A reset output 124 from service processor 102 is input to latch 112 and allows latch 112 to be reset when service processor 102 issues a reset command.

The output signal 126 from latch 112 is input to a CPLD 114, and is also input to service processor 102. CPLD 114 is a Complex Programmable Logic Device used to produce logical functions in a known manner. In the present invention, CPLD 114 is programmed to issue a throttle command 120 to the CPU, as well as to service processor 102, when output signal 126 from latch 112 indicates that the total blade current/load sensed by total blade current/load sensor 106 has exceeded the threshold. The throttle command 120 issued to the CPU actually engages the throttling procedure, while the same throttle command 120 input to service processor 102 informs the service processor 102 that the system is going into a throttle mode. It is beneficial for the service processor to know that a blade is throttling because the reduction in blade function may affect customer applications being run by the blade. By knowing that a blade is throttling, and that reduced function is occurring, more power might be allocated back to the blade and a different blade might be throttled to compensate.

The operation of the circuit of FIG. 1 is as follows. A user identifies the estimated actual usage for a blade that is configured with the system of FIG. 1. Using a keyboard or other known input device, this information is input to service processor 102 in a known manner. By inputting this estimated maximum actual usage, the user sets the threshold value that will be compared with the actual usage being made by the blade during operation. The user will take into consideration the options installed in the blade, what the particular blade is being used for, etc. It is anticipated that the estimated actual usage could be incorporated into the VPD of the blade rather than being manually input; however, currently-used blades contain data in the VPD that makes the assumption that the power usage of the blade will be equal to the power consumed when every element of the blade is operational.

As the blade operates, its total current/load value is sensed by total blade current/load sensor 106 and the sensor outputs a voltage 128 corresponding to the current/load level. This value is input to the A-to-D converter 104 of service processor 102 which converts the signal to a digital signal for processing by service processor 102. For example, after the detection of an overload condition, the system may need to know what the real-time actual load measurement is, as part of a recovery algorithm. Diagnostics, initialization and other recovery implementations may need this information.

Signal 128 is input also to comparator 110, and is compared with signal 132. Signal 132 is an analog representation of the threshold value 130 that has been input to the service processor 102 by the user. If the result of the comparison indicates that the threshold value 132 is being exceeded by the actual value 128, comparator 110 outputs a logic signal to latch 112 indicating that the blade is trying to draw more power than its pre-determined estimated maximum actual usage value. This logic value is input to latch 112. Latch 112 is utilized because the real-time current is application-dependent and could vary at millisecond speeds. Thus, signal 134 could oscillate at millisecond speeds, rendering it difficult to be used by the service processor. Thus, this signal is latched. The latched event is an indication that an overload event occurred since the last latch reset. A near real-time reading can be achieved by performing a latch reset followed by an immediate latch read. Although the latch is shown outside CPLD 114, the latch could also be implemented within the CPLD. Latch 112 passes a logic signal to CPLD 114 that causes CPLD 114 to issue a throttle command 120. This throttle command is directed to the CPU, which throttles the blade to keep it from exceeding the estimated maximum actual usage value. Throttle signal 120 also is input to service processor 102 to advise it of the throttling condition. At the first occurrence of this event, the system would likely reset the circuit and look for the event to repeat. After validity that the blade really needs more power, the system should take action to re-budget more power to this blade.

Figure 2:
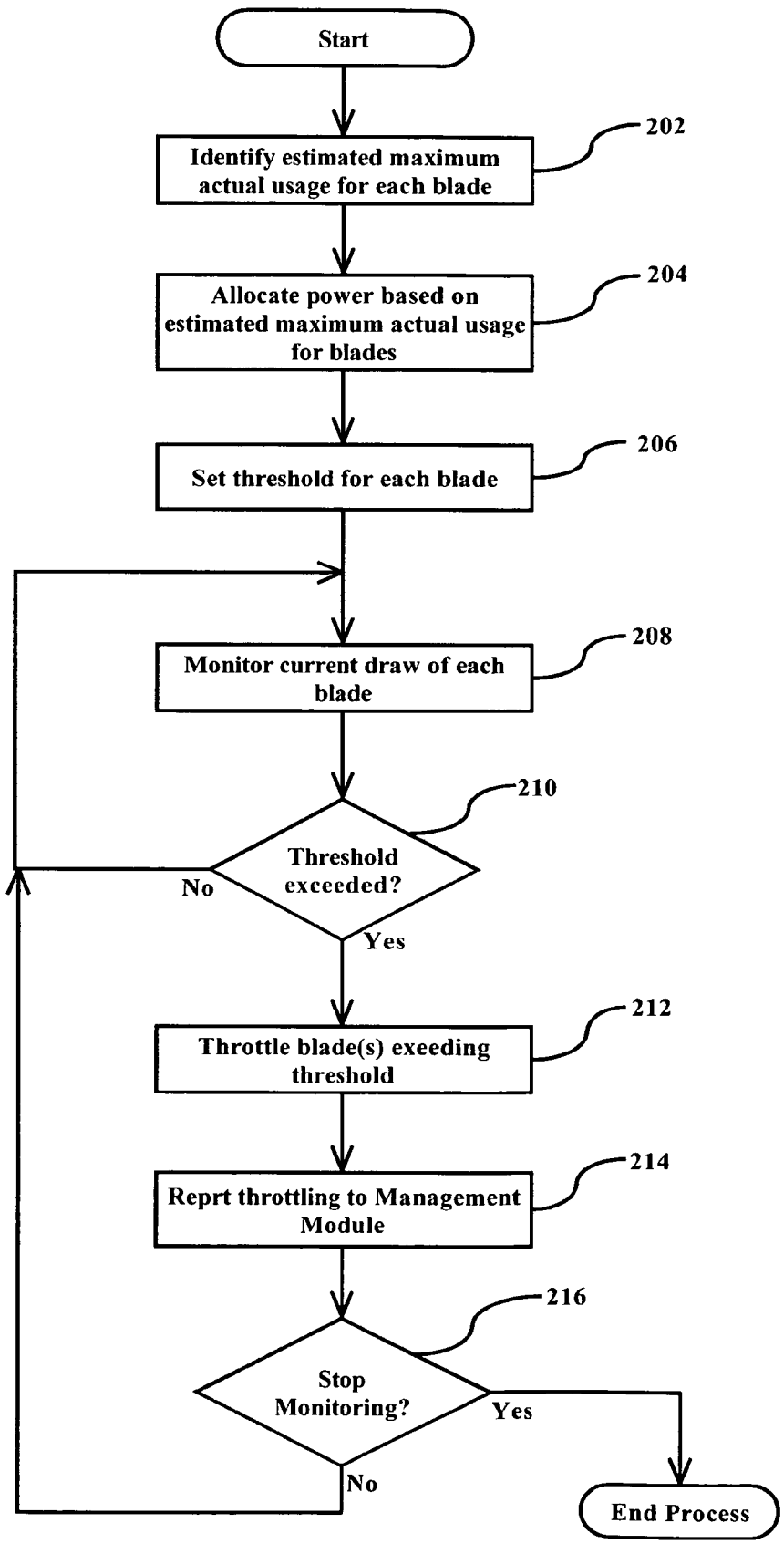
FIG. 2 is a flowchart illustrating the steps performed in accordance with the present invention.

FIG. 2 is a flowchart illustrating the steps performed in accordance with the present invention. At step 202, the estimated maximum actual usage for each blade in the blade system is identified. At step 204, power is allocated from the power supplies in the blade system based upon the estimated maximum actual usage for the blades. At step 206, the maximum actual usages estimated in step 202 are set as thresholds for each blade.

At step 208, the actual current draw of each blade is monitored. At step 210, a determination is made as to whether or not any of the thresholds have been exceeded. If no thresholds have been exceeded, the process proceeds back to step 208 for continued monitoring of each blade. If, however, at step 210, it is determined that a threshold has been exceeded, this indicates that one of the blades is beginning to operate above its maximum allocated threshold level. At step 212, the blade that is exceeding the threshold is throttled, to keep it from exceeding this maximum. At step 214, the throttling is reported to the management module. This can be utilized by system operators to identify occurrences of attempts to exceed power levels and, if desired, increase power levels and power level thresholds for that particular blade. The management module can also be configured, if desired, to search for underutilized or unpowered blades to increase the power budget of the throttling blade.

At step 216, it is determined whether or not continued monitoring of the system is desired. If it is desired to stop monitoring, the process ends. However, if it is desired to continue monitoring, the process proceeds back to step 208 to continue monitoring the blades.

The present invention is described herein in a hardware embodiment and this hardware embodiment is preferred for situations where fast throttling is desired. However, the above-described steps can be implemented also using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of each blade. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for throttle management in a blade computing system, wherein said blade computing system comprises a plurality of blades, comprising:
    identifying an estimated maximum power usage far each blade in the blade computing system;
    allocating power to each blade based on the identified estimated maximum power usage;
    monitoring the actual power draw of each blade; and
    automatically throttling any blade whose actual power draw reaches or exceeds a predetermined power-draw threshold level, wherein said predetermined power-draw threshold level for each blade is incorporated into VPD of each blade.

2. The method of claim 1, wherein said predetermined threshold level is specific for each blade.

3. The method of claim 2, wherein said threshold level for each blade is manually input to said blade.

4. A system for throttle management in a blade computing system, wherein said blade computing system comprises a plurality of blades, with each blade, with each blade comprising:
    a service processor receiving an estimated maximum power usage for each blade in the blade computing system and associating a predetermined power-draw threshold level with each blade based on its estimated maximum power usage value;
    a sensor sensing the actual power draw of each blade;
    a comparator comparing the sensed actual power draw of each blade with its associated predetermined threshold level and issuing a comparison result; and
    programmable logic configured to identify an over-threshold condition based on the comparison result of said comparator and issue a throttle command to any blade when said over-threshold condition occurs, wherein said threshold level for each blade is incorporated into the VPD) of each blade.

5. The system of claim 4, wherein said predetermined power-draw threshold level is specific for each blade.

6. The system of claim 5, wherein said threshold level for each blade is manually input to said blade.

* * * * *

UNITED STATES PATENT AND TRADEMARK OFFICE
CERTIFICATE OF CORRECTION

PATENT NO. : 7,650,517 B2 Page 1 of 1
APPLICATION NO. : 11/311818
DATED : January 19, 2010
INVENTOR(S) : Hughes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 762 days.

Signed and Sealed this

Twenty-third Day of November, 2010

David J. Kappos
*Director of the United States Patent and Trademark Office*